Oct. 8, 1929.  M. A. STREHLEIN  1,731,066
FASTENER FOR GARMENTS AND OTHER ARTICLES
Filed Jan. 14, 1928
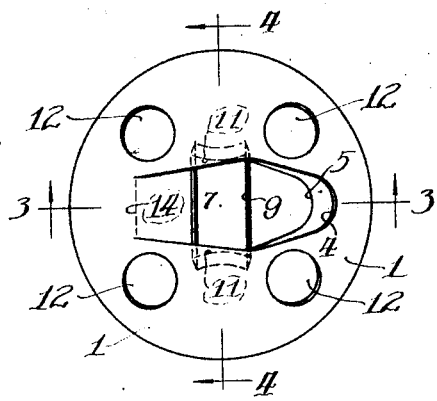
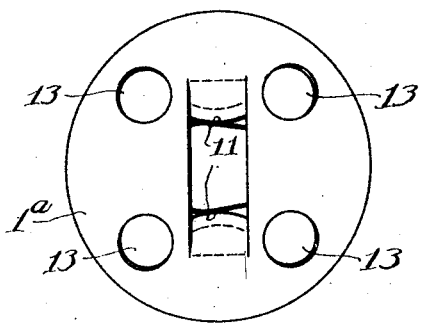
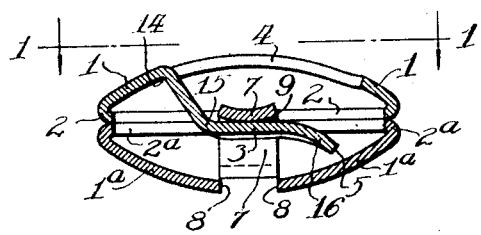
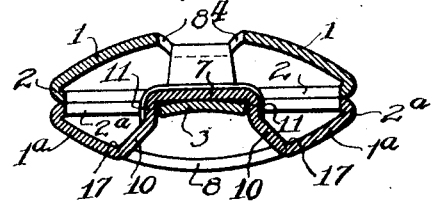
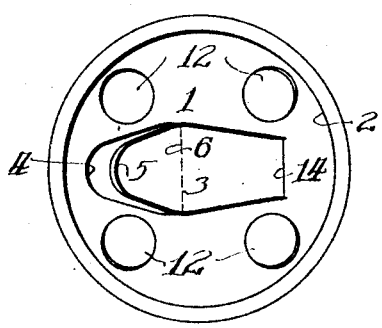
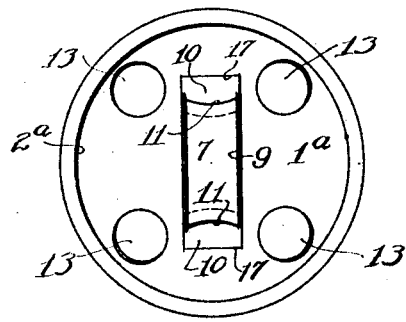
Inventor:
Mary A. Strehlein
By Charles Turner Brown
Atty.

Patented Oct. 8, 1929

1,731,066

UNITED STATES PATENT OFFICE

MARY A. STREHLEIN, OF EVANSTON, ILLINOIS

FASTENER FOR GARMENTS AND OTHER ARTICLES

Application filed January 14, 1928. Serial No. 246,730.

This invention relates to fasteners of the kind termed hooks and eyes.

Among the objects of the invention is to obtain a fastener comprising a disk, a hook integral with said disk, and an additional disk with an eye integral with said additional disk, both disks provided with a bead around the periphery thereof, which will come close to contact when the hook and eye are engaged. An additional object is to obtain disks provided respectively, with a hook and an eye which are integral with the disks and cut from and forced out of the body of the disks. An additional object is to obtain a fastener which is sightly in appearance, the operation whereof is readily understood, and easily manipulated by a person not particularly skilled in mechanics. And a still further object is to obtain a hook and eye fastener of the kind named which, when the hook and the eye are joined, will not become disengaged when no strain is placed thereon, or when a strain in a determined direction is put thereon. It is also an object of this invention to obtain a fastener of the kind named which is economically made, is durable, and not liable to become broken or out of order.

In the drawing referred to Fig. 1 is a view of a device embodying the invention taken or viewed on line 1—1, of Fig. 3, in the direction indicated by arrows. Fig. 2 is a similar view of a disk and eye integral therewith, separated from the hook member of the device. Fig. 3 is a vertical section of the device, taken on line 3—3 of Fig. 1 viewed as indicated by arrows. Fig. 4 is a vertical section of the device, taken on line 4—4 of Fig. 1, viewed as indicated by arrows. Fig. 5 is a top plan view of a disk and hook integral therewith forming one member of a device embodying the invention. And Fig. 6 is a top plan view of a disk and eye integral therewith forming a member of a device embodying the invention.

A reference character applied to designate a given part indicates said part throughout the several figures of the drawing wherever the same appears.

1 represents a metal disk which is concave on the face thereof which is opposed to the eye member of the fastening when the members forming the fastening are engaged, and 2 a bead around the periphery thereof. 3 represents a hook integral with disk 1, which is obtained by cutting the sides and one end thereof out of the body of the disk, and forcing it up out of the plane of said body. 4 represents the aperture in the disk which remains after the hook 3 is cut out of and forced up from the body of the disk. Hook 3 is preferably rounded at its end, as at 5, Figs. 1 and 5, to permit it to be easily inserted in the eye, hereinafter described; and the hook is what I term pear shaped, that is, its widest part is at the part thereof which extends through and is adjacent to one side of the eye with which it co-acts, say at the broken line 6, Fig. 5. 7 represents the eye member of the device which is obtained by cutting the sides thereof from the body of disk $1^a$, and forcing it out of the plane of the body of said disk. Disk $1^a$ is concave on the face thereof which is opposed to the hook member when the members of the fasteners are engaged. 8 represents the aperture in the disk which is caused by forcing eye 7 out therefrom. 9 represents the side or edge of the eye 7 which is adjacent to the part of the hook 3 which is indicated by broken line 6, when the hook and eye are joined, or engaged. 10 represents the inclined portion of the sides of the eye 7 which is adjacent to the body of the disk, and 11 the sides of the eye with which the widest part of hook 3 (as at the broken line 6, Fig. 5), comes in contact when the hook is being inserted in the eye. Said side walls or members 11 are substantially parallel, and preferably extend a distance from the top of the eye slightly less than the thickness of the metal forming hook 3, before meeting the inclined members 10. And said members 11 are, preferably spaced apart a distance slightly less than the widest part of hook 3, so that a little spring is given said hook as it is being joined to or engaged with said eye 7. This is to prevent the hook separating from the eye when the strain is not continuous on the members in a determined direction after they are engaged. 12 represent apertures in disk 1, and 13 corresponding apertures in disk $1^a$.

The disks are secured to a garment or other article by thread through said apertures, or by metal prongs extending therethrough, as preferred, the exact manner of securing the disks to any base not being a part of my invention. 14, Figs. 3 and 5, represents the line on which the riser of the hook 3 is bent, when said hook is forced out of the body of the disk 1. 15 represents the line of the bend between the riser of hook 3 and the portion thereof which engages with eye 7, said portion being substantially parallel with the body of the disk. The end of the hook 3 is curved, as at 16, to enable the rounded end of the hook to be easily entered in the eye 7. 17, Figs. 4 and 6, represents the line of the bend of members 10 adjacent to the body of the disk 1ª.

Hook 3 and eye 7 are arranged relative to the beads 2 and 2ª, so that when said hook and eye are in engagement said beads are in contact, or very nearly so to contact. By having disks 1 and 1ª, respectively, concave on the inner sides thereof, as is illustrated in Figs. 3 and 4, a space or chamber is obtained, when the hook and eye members are engaged, in which said hook and eye are positioned, and by placing beads 2 and 2ª on said concave sides, as illustrated, said beads may come in contact while said members are being engaged, and remain in close contact after engagement, so that there is little liability of their becoming disengaged when in use on garments.

I claim:

1. In a fastener, a disk provided with an aperture, the metal forced out of said disk to form said aperture arranged to constitute a hook, in combination with an additional disk provided with an aperture, the metal forced out of said additional disk to form the aperture therein arranged to form an eye integral with the disk, said disks concave on the meeting sides thereof, and provided with peripheral beads arranged to come in close contact when said hook and eye are joined.

2. In a fastener, a disk, a hook integral with said disk, and forced out of the body thereof, in combination with an additional disk, an eye integral with said additional disk and forced out of the body thereof, said eye comprising parallel side walls, and said hook having a portion thereof of substantially the same width as the distance between said side walls, said disk concave on the sides which are opposed when the hook and eye of the fasteners are engaged, with beads on said opposed sides.

3. In a fastener, a disk, a hook integral with said disk, and forced out of the body thereof, in combination with an additional disk, an eye integral with said additional disk and forced out of the body thereof, said eye comprising parallel side walls and said hook having a portion thereof of substantially the width the side walls are spaced apart, and said disks concave on the sides which are opposed when the hook and eye are engaged and provided with beads on said opposite sides.

4. In a fastener, a disk provided with an aperture, the metal forced out of said disk to form said aperture arranged to constitute a hook, in combination with an additional disk provided with an aperture, the metal forced out of said additional disk to form the aperture therein arranged to form an eye integral with the disk, said disks concave on the meeting sides thereof, and provided with peripheral edges arranged to come in close contact when said hook and eye are joined.

MARY A. STREHLEIN.